Figure 1:
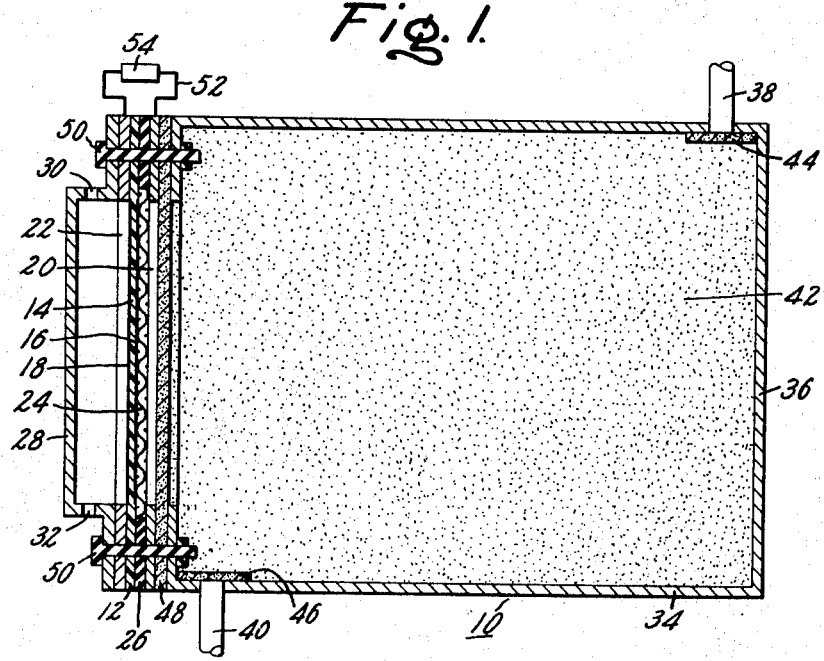

United States Patent
Titterington et al.

[15] 3,653,969
[45] Apr. 4, 1972

[54] FUEL CELL SYSTEM WITH PLURAL FUEL CELLS

[72] Inventors: William Alexander Titterington, Lynnfield; Robert White Milgate, Jr., Marblehead; John Peter Gallagher, Burlington, all of Mass.

[73] Assignee: General Electric Company

[22] Filed: May 9, 1966

[21] Appl. No.: 548,788

[52] U.S. Cl. ........................................................136/86 C
[51] Int. Cl. ................................................H01m 27/14
[58] Field of Search....................................................136/86

[56] References Cited

UNITED STATES PATENTS

| | | |
|---|---|---|
| 3,256,116 | 6/1966 | Justi et al.................................136/86 |
| 3,300,341 | 1/1967 | Gregory et al..........................136/86 |
| 3,125,468 | 3/1964 | Thompson et al. .....................136/86 |
| 3,338,747 | 8/1967 | Plust et al. ..............................136/86 |

FOREIGN PATENTS OR APPLICATIONS

| | | |
|---|---|---|
| 1,047,936 | 11/1966 | Great Britain..........................136/86 |
| 296,197 | 5/1965 | Netherlands............................136/86 |

OTHER PUBLICATIONS

Heffner et al., Hydrogen From Methanol in Fuel Cell Systems, by American Chemical Soc., pp. 322, 323, 1963/1964 Scientific Library 4/30/1965

Primary Examiner—Allen B. Curtis
Attorney—Carl O. Thomas, Frank L. Neuhauser, Oscar B. Waddell, Melvin M. Goldenberg and N. J. Cornfeld

[57] ABSTRACT

A system for purging a main fuel cell of impurities comprises an auxiliary fuel cell which utilizes at least one of the streams of gas provided to the main fuel cell, which stream carries gaseous impurities downstream from the main fuel cell to the auxiliary fuel cell whereat they are trapped.

3 Claims, 2 Drawing Figures

Patented April 4, 1972

3,653,969

Inventors:
William A. Titterington,
Robert W. Milgate, Jr.
John P. Gallagher,
by Carl O. Thomas
Their Attorney.

FUEL CELL SYSTEM WITH PLURAL FUEL CELLS

Our invention relates to apparatus and process for the disposal of purge gases.

Whenever a gas enclosing system is suspected of containing impurities it is standard practice to purge the system so as to sweep out the impurities. The gas that leaves the system during purging—hereinafter designated "purge gas"—is generally vented to the atmosphere.

Where highly flammable, explosive, or toxic gases are included in the purge gas atmospheric venting presents obvious hazards. Also, with the emerging awareness of the health hazards attendant to air pollution, there are likely to be an increased number of circumstances in which rejection of purge gas to the atmosphere may no longer be acceptable. Apart from this, however, there are many situations where purging is called for but where rejection of the purge gas to the atmosphere is either inconvenient or impossible. One situation of this type is where it is desired to maintain the system to be purged at a pressure below atmosphereic. Another exemplary situation is where the system to be purged lies entirely within a larger system such that there is no access to the atmosphere.

To provide a specific illustration, fuel cells are comprised of spaced electrodes separated by an electrolyte. A gaseous fuel such as hydrogen may be continuously supplied to one electrode while a gaseous oxidant such as oxygen may be similarly supplied to the remaining electrode. Assuming the use of pure hydrogen and pure oxygen, all of the fuel and oxidant supplied to the fuel cell is consumed electrochemically at the electrodes while water is formed as a reaction product adjacent on electrode Since the water formed as a reaction product can be separately removed, purging of the fuel cell during steady state operation should in theory be unnecessary.

In actual practice impurities will be present in the fuel and oxidant that cannot be efficiently reacted at the electrodes. Accordingly, if a fuel cell is operated for an extended period with the fuel and oxidant supply deadended at the respective electrodes, the non-reactive impurities will accumulate at the electrodes diluting the reactants and causing the fuel cell performance to decline. It is for this reason that conventional fuel cells are usually provided with an exhaust conduit adjacent each of the electrodes so that small amounts of oxidant and fuel may be continuously or intermittently bled off, thereby preventing the accumulation of inerts and decline in cell performance.

In many applications the purge gas from fuel cells poses no difficulty. The purge gases are simply vented to the atmosphere. Atmospheric purging is not feasible for certain applications, however. For example, in certain applications it is desireable that the pressure of the reactants be maintained below atmospheric as added insurance against explosion or fire hazard if the cell should be defective or is abused. Under these circumstances atmospheric purging may not be convenient.

In another class of applications the fuel cell may be used in a closed environment that it isolated from the atmosphere. In this situation merely venting the purge gas will ultimately contaminate the atmosphere within the closed environment. Further, where the fuel cell is to be used in the closed system over a prolonged period, venting within the system will eventually cause a pressure buildup of potentially dangerous proportions. For example, if oxygen and hydrogen are being vented from a fuel cell contained in a closed system, the entire void space of the system may be filled with a flammable or explosive mixture. Additionally, the pressure increase in itself may be objectionable. Of course, in any closed system to house human beings, such as a submarine or a space vehicle, non of these attendant disadvantages of purging the fuel cells could be tolerated.

It is an object of our invention to provide a process for disposing of purge gas.

It is another object of our invention to provide a means for disposing of purge gas.

It is a specific object of our invention to provide a system for generating electrical energy including a means for disposing of purge gas.

According to one aspect of our invention we provide a process comprised of electronically and electrolytically communicating first and second fuel cell electrodes. We contact one of the electrodes with an oxidizable gas and the remaining of the electrodes with a reducible gas. Gaseous impurities associated with at least one of the gases are at the same time absorbed.

As a second facet of our invention we provide a consumption cell comprised of first and second spaced fuel cell electrodes. We provide separate means for electronically and electrolytically communicating the electrodes. Means are provided for delivering to at least one of the electrodes a gas chosen from the class consisting of oxidizable and reducible gases, and means are also provided for absorbing a gaseous impurity associated with the gas.

As a broader combination we provide a system comprised of a fuel cell unit and a consumption cell unit. We provide means for supplying a gas chosen from the class consisting of oxidizable and reducible gases to the fuel cell unit and means for delivering the gas from the fuel cell unit to the consumption cell unit.

Figure 2:
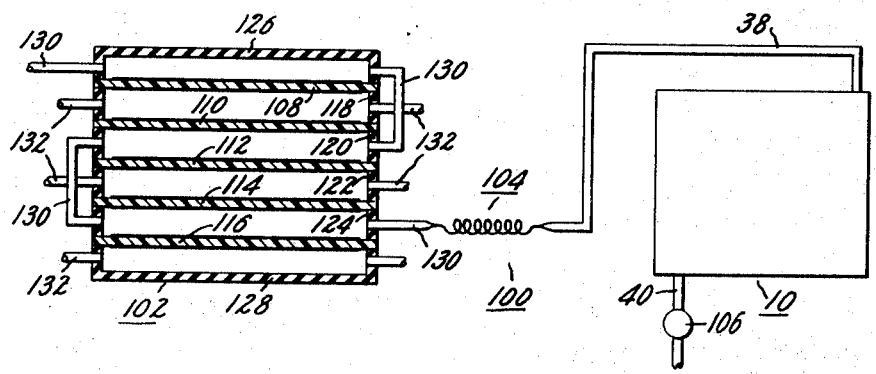

Our invention may be better understood by reference to the following detailed description considered in conjunction with the drawings, in which FIG. 1 is a vertical sertion of a consumption cell unit, and FIG. 2 is an elevation of a system including a fuel cell unit and a consumption cell unit with parts in section.

In the practice of our process first and second fuel cell electrodes are electrolytically and electronically communicated. The electrolytic communication may be provided by a fuel cell electrolyte such as a cation or anion exchange membrane, an acid or alkaline solution held in a capillary matrix, or a free body of acid or alkaline solution, as is well understood in the art. The electronic connection between the electrodes is provided by any conventional electrical connector. Preferably, the electrical connector should incorporate therein means to limit the electrical current flow therethrough such as a resistance, a current control device, etc.

An electrochemically reducible gas is supplied to one electrode while and electrochemically oxidizable gas is supplied to the remaining electrode. One or both of the gases may be a purge gas containing a gaseous impurity. Where only one of the gases is a purge gas the remaining gas is provided merely for the purpose of allowing the purge gas to be consumed. In many applications the remaining gas will be supplied from the oxygen in the atmosphere so that no particular inconvenience is represented by the requirement that a gas in addition to a purge gas be supplied.

The gaseous impurity present in the purge gas may be present in any proportion. If the purge gas is a reducible gas, the gaseous impurity is preferably either an inert or less readily reducible gas. If the purge gas is an oxidizable gas, the gaseous impurity is preferably either an inert or less readily oxidizable gas. Where the purge gas is a reducible or oxidizable gas and a gaseous impurity is present which is oxidizable or reducible, a portion of the purge gas and the gaseous impurity will be spontaneously combined on the surface of the electrode. Where the reactable impurity is present in very small amounts this is not objectionable; however, where substantial amounts of reactable impurity are present, the apparatus employed may be adversely affected by over heating or an explosion hazard may be created.

It is anticipated that our invention may be most advantageously applied to disposing of a purge gas containing a major proportion of a gas chosen from the class consisting of oxidizable and reducible gases and a remaining, minor proportion of gaseous impurity which is either inert or less capable of entering into the oxidation or reduction reaction. Under these circumstances the major proportion of the gas to be disposed of is reduced in volume by reaction at the fuel cell electrode to form a non-gaseous reaction product. Assuming, for example, oxygen or hydrogen as the purge gas reacting electrochemically at one electrode while hydrogen or oxygen is supplied to a remaining electrode in electronic and electrolytic communication therewith, the purge gas is transformed from the gas phase to water with a large reduction in displacement volume. For most practical purposes the purge gas may be considered to be efficiently disposed of, since the volume displacement of the water may be considered negligible compared to that of the gas.

If purge gas is disposed of in this manner for a prolonged period of time, the gaseous impurities which are chemically inert or more slowly reacted will accumulate adjacent the electrode. If the gaseous impurities are left alone they will, after an extended period, dilute the purge gas to the point where the rate of consumption on the fuel cell electrode is adversely affected. To counteract this it is preferred to selectively condense at least a portion of the gaseous impurities associated with the purge gas. This may be accomplished by placing adjacent the electrode a suitable chemical for selectively condensing the gaseous impurity desired to be removed. This may be accomplished by providing a chemical having a particular affinity for reaction with the impurity. According to another condensing technique the gaseous impurity may be selectively absorbed. Other useful techniques of selectively condensing will readily occur to those skilled in the art.

To provide a specific illustration, hydrogen may be supplied to a fuel cell electrode as a purge gas having small amounts of gaseous hydrocarbons entrained therein. In this situation, the remaining electrode in electronic and electrolytic communication may be exposed to the air, which will supply the oxidant. The hydrogen and oxygen will electrochemically react to yield water. The rate of reaction is controlled by the resistance incorporated in the electronic connection between the electrodes. The gaseous hydrocarbons will also react at the associated electrode but at a much slower rate than the hydrogen such that if left along it will increase in concentration adjacent the electrode to slow the electrode reaction. To prevent this an absorbing means such as a body of carbon, preferably activated coconut charcoal, is placed adjacent the electrode. The carbon exhibits a much higher adsorption rate toward hydrocarbons than hydrogen and accordingly selectively adsorbs the gaseous impurity. By this technique it is seen that substantially all the purge gas is changed from the gaseous state in which it occupies a large volume to a condensed state in which it occupied a relatively negligible volume. Should trace amounts of other impurities be present which are not condensible at either the electrode or are on the carbon these gaseous impurities can be stored adjacent the electrode. If their proportion is slight, their adverse diluting effect and hence affect on hydrogen consumption will also be slight. If small amounts of a reducible impurity such as oxygen is also associated with the purge gas, it may be directly combined with the hydrogen on the electrode.

According to a specific application of our process, it is anticipated that the purge gas will be delivered from a fuel cell unit, which may be either a single fuel cell or a fuel battery comprised of a plurality of fuel cells. The purge gas is provided by supplying the fuel cell unit a gaseous reactant in an amount exceeding the consumption rate of the fuel cell unit. While the proportion of gaseous impurities in the gaseous reactant may initially be negligible, the selective removal of the gases capable of readily participating in an oxidation or reduction reaction within the unit will substantially increase the proportion of gaseous impurities associated. If the fuel cell unit is operated dead-ended — that is, with no way for the gas supplied to exit from the unit except by reaction, gaseous impurities will build up in the unit in use decreasing the electrical energy generating capacity thereof. Continuous or intermittent bleeding with disposal of the purge gas as previously described allows the fuel cell unit to be continuously operated at a high performance level without creating the attendant problems conventionally associated with disposal of purge gas.

Our process may be more fully appreciated by considering certain structural embodiments shown in the drawings and hereinafter described in detail.

Referring to FIG. 1, a consumption cell unit 10 is shown comprised of an electrode-electrolyte assembly 12 made up of an ion exchange membrane 14 and electrodes 16 and 18. Identical current collectors 20 and 22 are mounted adjacent electrodes 16 and 18, respectively. The current collectors are formed of a corrosion resistant electrically conductive material. The current collectors are formed with a plurality of central apertures which permit gas to reach the electrodes. The electrically conductive portions adjacent the electrode between the apertures collect electrical current therefrom. A corrosion resistant screen 24 is interposed between the electrode 16 and the current collector 20. A similar screen could be provided between electrode 18 and current collector 22. To insure against gas leakage a shim 26 is provided around the periphery of the screen. It is appreciated that in most applications the screen will be sufficiently thin that no shim will be required to achieve an edge seal between the current collector and the ion exchange membrane.

Adjacent the current collector 22 a gas enclosing means 28 is provided having first and second ports 30 and 32 for the circulation of a gas therethrough. The ports may be provided with conduits, not shown for delivery of gas to and from the enclosing means. Where the gas supplied to the electrode 18 is air or a gas forming the atmosphere of a closed system in which the consumption cell unit is enclosed, the enclosing means may be omitted entirely or the ports left open to the associated atmosphere. According to another modification one of the ports may be omitted.

Adjacent the current collector 20 is mounted a plenum 34. The plenum is formed of a housing 36 provided with conduits 38 and 40 and, as shown, is provided with a body of particulate adsorptive material 42. To retain the adsorptive material in position in the plenum porous coherent plates 44 and 46 may be provided adjacent the conduits. A similar plate 48 is provided between the plenum housing and the current collector 20. The plates may be formed of adsorptive material, if desired, to supplement the action of the particulate adsorptive material, although this is not necessary.

The consumption cell unit is held together by insulative tie bolt assemblies 50 positioned around the periphery of the electrodes. The current collectors (and hence the electrodes) are electronically connected by electrical conductive means 52 including a current limiting means 54 such as a resistor mounted therein.

The consumption cell unit 10 shown in FIG. 1 is, of course, only intended to illustrate a preferred embodiment. Numerous modifications may be made in the unit without departing from the teaching of our invention. For example, we anticipate that where it is desired to simultaneously dispose of an oxidizable and a reducible purge gas, a second plenum 34 may be substituted for the gas enclosing means 28. Further, where air constitutes the reactant at the electrode 18, the gas enclosing means 28 may be entirely omitted. A fuel cell has been shown which employs an ion exchange membrane as an electrolyte means. Any conventional electrolyte means may be substituted. For example, a frame for confining a free aqueous electrolyte may be substituted. Also a capillary matrix for holding a fluid electrolyte immobilized may be substituted. The current collectors and screen are not essential. The electrical conductive means 52 may be connected directly to the electrodes. The tie-bolt assemblies are not essential, since the unit could be held together adhesively or by any other well-known conventional mechanical joining means. Instead of employing only a single electrode-electrolyte assembly as shown, a plurality of electrode-electrolyte assemblies may be mounted in the walls of the plenum. The adsorptive material may be compacted into a coherent porous body and the confining plates omitted. For some applications the plates may be retained or omitted and the body 42 of adsorptive material omitted. In other applications it may be desireable to modify the plenum so that it can store substantial quantities of a liquid phase reaction product such as water formed at the electrode 16 out of contact therewith. In still another form a wick may be incorporated in the plenum to remove liquid formed at the electrode 16 as disclosed by Blackmer et al. in copending application Ser. No. 229,679, filed Oct. 10, 1962, now U.S. Pat. No. 3,309,843. In this regard, it is generally preferred that the electrolyte be chosen so that reaction products will be formed adjacent the electrode 18 rather than the electrode 16, assuming a single plenum.

Operation of the consumption cell unit 10 may be conveniently illustrated by reference to a specific use in which hydrogen purge gas containing a selectively adsorbable gaseous impurity is to be disposed of and the electrode 18 is exposed to the atmosphere through ports 30 and 32. Prior to using the consumption cell unit as described, it is preferably purged with a substantially inert gas to remove air which may be initially present in the plenum. Hydrogen is then admitted through conduit 38 and exhausted through conduit 40. When the inert gas has been bled from the unit, conduit 40 is closed by a suitable means such as a valve.

Purge gas is admitted through conduit 38. The hydrogen portion is electrochemically reacted at the electrode 16 while oxygen from the air is reacted at electrode 18. The rate of reaction is controlled by the current limiting means 54. The reaction rate is preferably, although not necessarily, limited to a low value so that the fuel cell is not over heated. If a cation exchange membrane is employed as is preferred, the reaction product will be generated adjacent electrode 18 in the form of water or water vapor. The adsorbable impurity associated with the purge gas will be adsorbed by the plates or the body 42. Variant modes of operating the consumption cell unit will be readily apparent in view of the previous description of our process.

FIG. 2 illustrates a system 100 for the practice of our invention comprised of a consumption cell unit 10, a fuel cell unit 102, and a back diffusion restricting means 104. The consumption cell is similar to that shown in FIG. 1. The conduit 38 is connected to the back diffusion restricting means, and the conduit 40 is provided with a valve means 106.

The fuel cell unit is formed of a plurality of electrode-electrolyte assemblies 108, 110, 112, 114, and 116. Adjacent assemblies are mounted in spaced relation by frames 118, 120, 122, and 124. End closures 126 and 128 are mounted adjacent the end-most assemblies. For purposes of illustration and closure 126 and frames 120 and 124 are shown connected in a series by first reactant conduit means 130, which connects the last frame in the series, 124, with the back diffusion restricting means 104. Conduit means 132 are provided for circulating a second reactant through end closure 128 and frames 118 and 122.

To illustrate the application of our invention to the combination of a fuel cell unit and a consumption cell unit, a first reactant of acceptable purity is fed to the end closure 126. A portion of the reactant is consumed by the assembly 108, thereby increasing the proportion of gaseous impurities which may be present. The first reactant is then passed to the frame 120 where a portion is reacted by each of the assemblies 110 and 112. Finally, the first reactant is passed to the frame 124 where a portion is reacted by each of the assemblies 114 and 116. By this time the purge gas passing from the frame 124 contains a substantial proportion of gaseous impurities. The proportion is not sufficiently high to adversely affect the performance of the assemblies, but it is high enough that if the gas flow were dad-ended into frame 124 sufficient impurities would accumulate to adversely affect the electrical energy generating capabilities of the assemblies, starting with assemblies 114 and 116 but also affecting to a lesser degree assemblies 108, 110, and 112.

To insure efficient performance of the assemblies it is only necessary that the assemblies be purged, either continuously or intermittently. As shown the system is adapted for continuous purging. Assuming the diameter of conduits 130 and 38 to approximate that of the remaining conduits servicing the fuel cell unit, the velocity of purge gas from the fuel cell unit to the consumption cell would be so low that substantial quantities of gaseous impurities supplied to the consumption cell unit could diffuse back to the fuel cell unit. To prevent this back diffusion restricting means 104 is provided. In a preferred form this means is comprised of a length of comparatively small diameter tubing. Since the cross-sectional area of the tubing is small, the velocity therein is comparatively high. The high velocity effectively restricts and in most instances eliminates back diffusion.

As will be readily appreciated the fuel cell unit 102 is merely intended to illustrate a preferred type of fuel cell unit that may be employed in the practice of our invention. Any conventional fuel cell or fuel battery could be substituted. While it is preferred to pass the reactant in series through the cells of a fuel battery, this is not necessary. The fluid relationship between the conduit means 132 for supplying the second reactant is not shown since this is immaterial—either a series or parallel arrangement could be used. Similarly, the electrical connections to the assemblies are omitted from the drawing, this also being immaterial to the practice of the invention. While the system shown is adapted for continuous purging, it is appreciated that intermittent purging may be accomplished by substituting or supplementing the back diffusion restricting means with a valve means or by opening the electrical conductive means 52 or by the use of both in combination.

While we have described our invention with reference to certain preferred embodiments, it is appreciated that numerous modifications will be readily suggested to those skilled in the art. It is accordingly intended that the scope of our invention be determined with reference to the following claims.

What we claim as new and desire to secure by Letters Patent of the United States is:

1. A non-purge fuel cell power supply system comprising:
   a main fuel cell and an auxiliary fuel cell;
   said main fuel cell including:
      first and second spaced apart fuel cell electrodes,
      means electrolytically communicating said electrodes,
      means electronically communicating said electrodes;
   said auxiliary fuel cell including:
      first and second spaced apart fuel cell electrodes,
      means electrolytically communicating said electrodes, and
      means for passing a flowing stream of gas, chosen from the class consisting of oxidizable and reducible gases, initially through said main fuel cell in contact with an appropriate one of said electrodes thereof, and subsequently, along with any impurities captured by the stream, through said auxiliary fuel cell in contact with an appropriate one of said electrodes thereof, said means for passing the stream of gas including a plenum forming means in said auxiliary fuel cell having an inlet for receiving said impurity containing stream of gas from said main fuel cell and an aperture for communicating such gas to said appropriate one of said electrodes to consume said stream of gas and also containing a material for absorbing said impurities to remove them from the stream and said fuel cells without purging the stream and impurities to the exterior of the system,
   and means for retaining said impurities in said auxiliary fuel cell to remove said impurities without purging either said main or said auxiliary fuel cell.

2. A system according to claim 1 wherein said gas is hydrogen and said adsorbing material is carbon.

3. A system according to claim 1 wherein
   said means for passing said flowing stream from said main fuel to said auxiliary level cell includes a conduit having a restricted portion therein to provide a relatively high unidirectional gas velocity therethrough.

* * * * *